United States Patent
Nesta et al.

(10) Patent No.: US 10,038,795 B2
(45) Date of Patent: Jul. 31, 2018

(54) ROBUST ACOUSTIC ECHO CANCELLATION FOR LOOSELY PAIRED DEVICES BASED ON SEMI-BLIND MULTICHANNEL DEMIXING

(71) Applicant: SYNAPTICS INCORPORATED, San Jose, CA (US)

(72) Inventors: Francesco Nesta, Aliso Viejo, CA (US); Trausti Thormundsson, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/701,374

(22) Filed: Sep. 11, 2017

(65) Prior Publication Data

US 2017/0374201 A1    Dec. 28, 2017

Related U.S. Application Data

(63) Continuation of application No. 14/809,134, filed on Jul. 24, 2015, now Pat. No. 9,762,742.

(60) Provisional application No. 62/028,777, filed on Jul. 24, 2014.

(51) Int. Cl.
*H04R 9/08* (2006.01)
*H04M 9/08* (2006.01)

(52) U.S. Cl.
CPC ................... *H04M 9/082* (2013.01)

(58) Field of Classification Search
CPC ..................................... H04M 9/082
See application file for complete search history.

(56) References Cited

U.S. PATENT DOCUMENTS

| | | | |
|---|---|---|---|
| 8,189,766 B1 | 5/2012 | Klein | |
| 2006/0018460 A1 | 1/2006 | McCree | |
| 2008/0086309 A1 | 4/2008 | Fischer | |
| 2008/0208538 A1 | 8/2008 | Visser | |
| 2009/0254338 A1 | 10/2009 | Chan | |
| 2011/0170683 A1 | 7/2011 | Lu | |
| 2012/0120218 A1 | 5/2012 | Flaks | |
| 2012/0308029 A1 | 12/2012 | Christoph | |
| 2014/0286497 A1 | 9/2014 | Thyssen | |

*Primary Examiner* — Mark Fischer
(74) *Attorney, Agent, or Firm* — Haynes and Boone, LLP

(57) ABSTRACT

A method for echo cancellation in multichannel audio signals includes receiving a plurality of time-domain signals, including multichannel audio signals and at least one reference signal, transforming the time-domain signals to K under-sampled complex-valued subband signals using an analysis filter bank. A probability of acoustic echo dominance is produced using a single-double talk estimator, and a multichannel source separation is performed based on the probability to decompose the audio signals into a near-end source signal and a residual echoes using source separation. The residual echo components are removed from the near-end source signal using a spectral filter bank, and the subband audio signals are reconstructed to a multichannel time-domain audio signal using a subband synthesis filter.

20 Claims, 4 Drawing Sheets

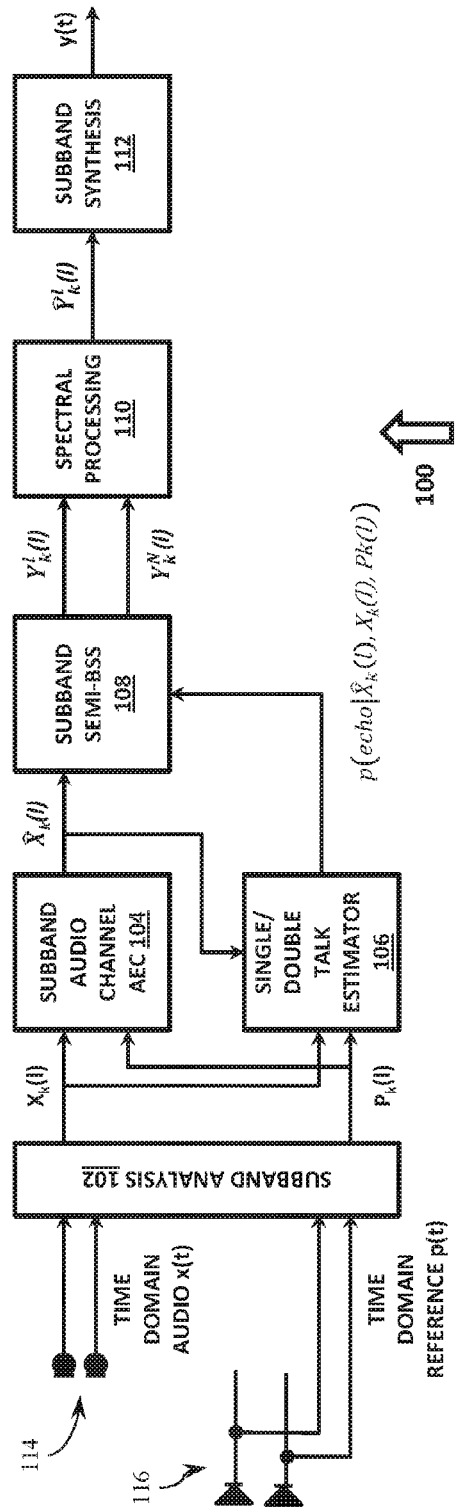
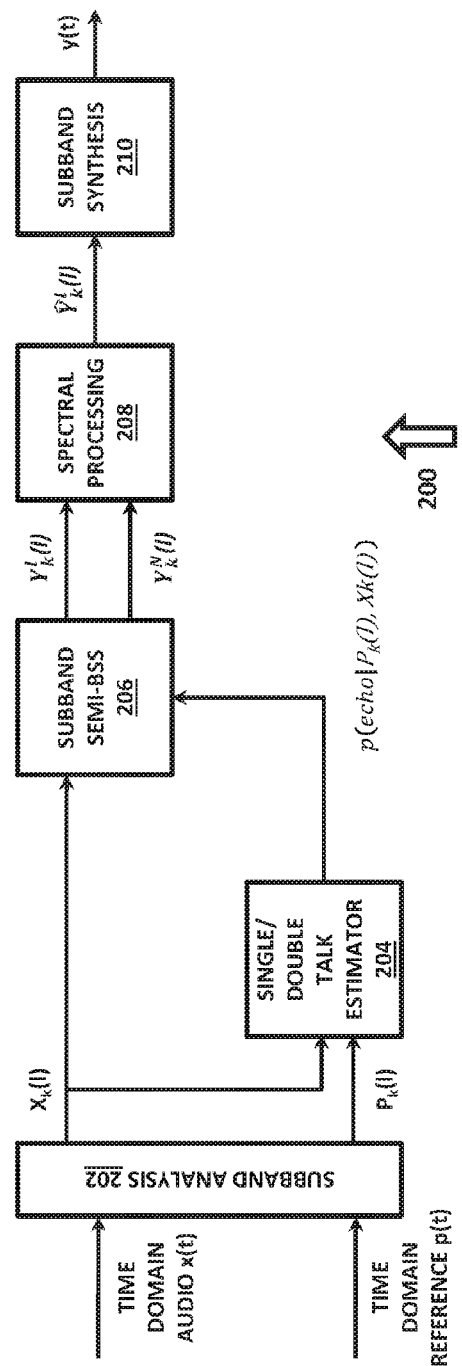

US 10,038,795 B2

ROBUST ACOUSTIC ECHO CANCELLATION FOR LOOSELY PAIRED DEVICES BASED ON SEMI-BLIND MULTICHANNEL DEMIXING

CROSS-REFERENCE TO RELATED APPLICATIONS

The present application is a Continuation of U.S. patent application Ser. No. 14/809,134, filed Jul. 24, 2015, which claims the benefit of and priority to U.S. Provisional Patent Application No. 62/028,777, filed Jul. 24, 2014, which are hereby incorporated by reference in their entirety. The present application is related to commonly owned U.S. Patent Application Publication Number 2015/0117649, filed Oct. 6, 2014, and titled "Selective Audio Source Enhancement," now U.S. Pat. No. 9,654,894, which is hereby incorporated by reference in its entirety.

TECHNICAL FIELD

The present disclosure relates generally to audio processing, and more specifically to a system and method for acoustic echo cancellation that uses semi-blind multichannel demixing.

BACKGROUND OF THE INVENTION

Multimedia devices such as TVs, set-top-boxes, tablets and personal computers generate acoustic noise through their audio playback system. Audio sounds are produced when playing multimedia contents (e.g. movies, music), when using a system for interactive dialogue management (or audio notifications) and when participating in an audio conference, to name a few examples. When such systems also employ automatic speech recognition, such as to allow hands-free system control, the echo of the audio playback system is recorded by the microphones, which reduces the ability of the system to understand commands.

SUMMARY OF THE INVENTION

A system and method for processing multichannel audio signals and producing an echo canceled enhanced multichannel output signal is provided that includes receiving a plurality of time-domain signals, including multichannel audio signals and at least one reference signal, and transforming the received time-domain signals to K undersampled complex-valued subband signals using an analysis filter bank. A probability of acoustic echo dominance is produced using a processor-implemented single-double talk estimator. Supervised, multichannel linear adaptive processing is performed, controlled by the probability of acoustic echo dominance, to decompose the complex-valued subband signals into a near-end source signal and residual echo signal using a processor-implemented subband source separation module. Residual echo components are removed from the near-end source signal using a processor-implemented spectral filter bank. The subband signals are reconstructed to a multichannel time-domain audio signal using a processor-implemented subband synthesis filter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings:

FIG. 1 is a diagram of a system for echo cancellation with loosely paired devices with an echo signal estimate, in accordance with an exemplary embodiment of the present disclosure;

FIG. 2 is a diagram of a system for echo cancellation with loosely paired devices and no echo signal estimate, in accordance with an exemplary embodiment of the present disclosure;

DETAILED DESCRIPTION OF THE INVENTION

Figure 3:
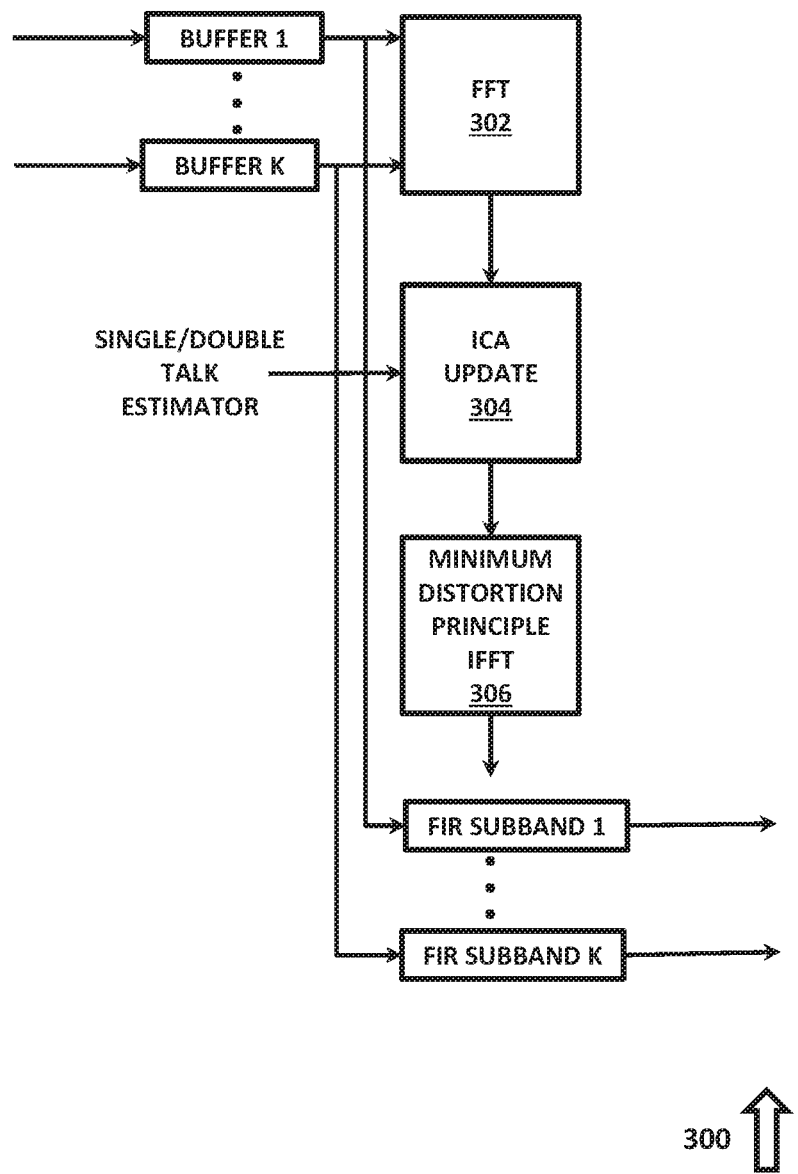
FIG. 3 is a diagram of a system for subband semi-blind source separation (BSS) architecture in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for echo cancellation with loosely paired devices with an echo signal estimate, in accordance with an exemplary embodiment of the present disclosure. System 100 includes subband analysis filter bank 102, subband audio channel acoustic echo canceller (AEC) 104, single/double talk estimator 106, subband semi-blind source separation (BSS) module 108, spectral processing module 110 and subband synthesis filter 112, each of which can be implemented in hardware or a suitable combination of hardware and software, and which can be one or more software systems operating on one or more processors.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Subband analysis filter bank 102 receives multichannel time domain signals from an audio source $x(t)=[x_1(t), \ldots x_N(t)]$ and generates a multichannel complex-valued decomposition subband audio signal $X_k(l)$ for a plurality of frequency bands k. In one exemplary embodiment, subband analysis filter bank 102 can be implemented as a complex filter bank having a plurality of k complex-valued filters that are used to decompose each channel of a received signal into k frequency subbands. The subband analysis can be performed for each of plurality of time domain audio signals x(t) and for each of a plurality of time domain reference signals $p(t)=[p_1(t), \ldots p_Q(t)]$. In one exemplary embodiment, the time domain audio signals can be generated from two or more microphones 114 (N>=2), and the time domain reference signals can be generated from one or more audio data sources (Q>=1), such as from multiple loudspeakers 116 playing sound in the environment where the multichannel recording x(t) is made.

Subband audio channel AEC 104 receives the decomposed audio signals $X_k(l)$ and reference signals $P_k(l)$, and performs linear acoustic echo cancellation of the reference signals on each of the subbands K of the multichannel audio data. In one exemplary embodiment, a linear AEC algorithm or other suitable systems or devices can be used to perform linear acoustic echo cancellation processing on each subband and channel of the multichannel audio data.

Single/double talk estimator 106 receives the multichannel input and output signals of the subband audio channel AEC 104 and, for each audio channel, generates a probability for each of the subbands k for whether the echo signal dominates the near-end speaker or not. In one exemplary embodiment, a binary probability for each audio channel subband can be computed from the subband echo to return loss enhancement ratio (ERLE), computed from the input and output signals for subband audio channel AEC 104 as:

$$p(\text{echo} \mid X_k(l), \hat{X}_k(l), P_k(l)) = 1, \text{ if } ERLE_k(l) > \text{threshold}$$
$$= 0, \text{ otherwise,}$$

where, $$ERLE_k(l) = \frac{E[\|X_k(l)\|^2]}{E[\|\hat{X}_k(l)\|^2]}$$

where the threshold is chosen according to the minimum expected echo to near-end ratio and E[ ] indicates the expectation operator (which can be approximated with a smooth time-average).

Subband semi-BSS module 108 provides a semi-blind source separation controlled by the single talk probability to steer demixing filters to separate a residual echo signal and a near end source signal from the multichannel audio source signal, $\hat{X}_k(l)$. Semi-blind source separation suitable for use in the exemplary embodiment is generally described in "Convolutive Undetermined Source Separation through Weighted Interleaved ICA and Spatio-temporal Correlation," F. Nesta and M. Omologo, LVA/ICA, March 2012, the contents of which are incorporated herein by reference.

In the exemplary embodiment, the probability is transformed into "weights" to control a weighted natural gradient algorithm, which splits the signal mixture in the individual near-end and residual echo signal components through demixing:

$$\hat{Y}_k^s(l) = G_k^s(l) * \hat{X}_k(l)$$

where $G_k^s(l)$ is the matrix of time-domain filters, subject to the minimal distortion principle (1), which recovers the multichannel output signal image of the sth source component. Minimal distortion principle in blind source separation suitable for use in the exemplary embodiment is described in "Minimal distortion principle for blind source separation," K. Matsuoka and S. Nakashima, Proceedings of International Symposium on ICA and Blind Signal Separation, San Diego, Calif., USA, Dec. 2001, the contents of which are incorporated herein by reference. The filters are estimated using a subband modification of the weighted natural gradient algorithm adaptation (2) and setting the weights as:

$$\omega_1 = 1 - p(\text{echo} \mid X_k(l), \hat{X}_k(l), P_k(l))$$

$$\omega_s = p(\text{echo} \mid X_k(l), \hat{X}_k(l), P_k(l))$$

$$\forall s = 2 \ldots N$$

where N is the number of microphone channels, and $w_s$, are the weights of the diagonal weighting matrix. This weighting scheme induces the natural gradient to estimate the near-end signal component at the first output $\hat{Y}_k^1(l)$ and the residual echo components at the remaining outputs $\hat{Y}_k^{s=2 \ldots N}(l)$.

Spectral processing module 110 enhances the near-end output signals by combining the estimated signal components through a standard spectral filtering approach, such as Wiener filtering or binary masking. Wiener filtering provides a statistical approach to filter noise from a source signal that is characterized by the assumption that the signal and noise are stationary linear stochastic processes with known spectral characteristics or known autocorrelation and cross-correlation, and is generally based on minimum mean-square error (MMSE) processing. Binary masking is a signal processing technique that separates a desired signal from a mixture by retaining only the time-frequency units where the signal-to-noise ratio (SNR) exceeds a predetermined threshold.

Subband synthesis filter 112 combines the subband components of the processed multichannel audio signal into a single multichannel audio signal, which may be performed by upsampling each subband component at a rate that is commensurate with the total bandwidth to be created, translating each channel to its new center frequency, and summing the streams of samples. The net frequency response of each channel is the product of the synthesis filter with the frequency response of the filter bank. Ideally, the frequency responses of adjacent channels sum to a constant value at every frequency between the channel centers, for perfect reconstruction, but other suitable processes can also or alternatively be used.

In operation, system 100 performs selective source pickup for a multichannel audio signal by separating a near-end speech signal from the residual echo component at the output of the linear AEC.

FIG. 2 is a diagram of a system 200 for echo cancellation with loosely paired devices and no echo signal estimate, in accordance with an exemplary embodiment of the present disclosure. System 200 is similar to system 100, but omits the linear acoustic echo cancellation processing, such as for use in systems where no linear echo signal is present. System 200 includes a subband analysis filter bank 202, a single-double talk estimator 204, subband semi-blind source separation module 208, spectral processing module 208 and subband synthesis filter 210, which correspond to elements 102, 106, 108, 110 and 112 of FIG. 1.

FIG. 3 is a diagram of a system 300 for subband semi-blind source separation (BSS) architecture in accordance with an exemplary embodiment of the present disclosure. System 300 can be implemented in hardware or a suitable combination of hardware and software, and can be one or more software systems operating on one or more processors.

Fast Fourier transform (FFT) processor 302 receives K time-domain subband signals that have been decomposed into K complex-valued (non-symmetric) subbands. The subband signals are buffered according to the filter length adopted in each subband in buffers 1 through K. The size of the buffer depends on the order of the filters, which is adapted to the characteristic of the reverberation (i.e. long filters are used for low frequencies while short filters for high frequencies). Because the filters estimated by the frequency-domain BSS adaptation are generally highly non-causal, the disclosed structure can be used to reduce the overall I/O delay and ensure that the same input and output delay is imposed for the processing performed for each subband.

The frequency domain data is provided to independent component analysis (ICA) update 304, which separates out multiple independent signal components—a speech signal and a noise signal. This analysis is independent of the number of microphones. The decomposition is obtained through the weighted natural gradient (2) in order to induce one component to be associated to the desired near-end signal. For example, if there are two microphone signals, then the first ICA output component is used to estimate the near-end signal and the second output component is used to estimate the noise signal. Likewise, if there are three microphone signals, then the first ICA output component is used to isolate the near-end signal and the second and third components are used to isolate the echo noise signals.

Based on whether a target near-end source is dominant or not, a constrained ICA adaptation is run in each subband in order to estimate spatial FIR filter coefficients. Because ICA decomposes a multivariate signal into independent non-Gaussian signals, it is typically the case in certain embodiments that if N sources are present, at least N observations (e.g. microphones) are needed to recover the original signals. However, by treating the signal as either containing 1) a target speech signal and a noise signal, or 2) a noise signal only, ICA can be used with two or more microphones and an unknown number of noise sources. This approximation provides suitable results as long as the target speech signal is independent from the noise signal and the distribution of the signals in each of the target speech signal and the noise signal are non-Gaussian.

While the target speech signal and noise signal are assumed to be independent, their signal mixtures are not, because the signal mixtures share the same source signals. Furthermore, based on the Central Limit Theorem, the distribution of a sum of independent random variables tends towards a Gaussian distribution, such that the sum of N independent random variables will usually have a distribution that is closer to Gaussian than any of the N original variables, and the temporal complexity of the signal mixture will typically be greater than that of its simplest constituent source signal.

The adaptation is run at a fraction of the buffering rate to save computational power. The buffered subband signals are filtered with the actual FIRs to produce a linear estimation of the target and noise components.

In each subband, the estimated components from minimum distortion principle (MDP) inverse fast Fourier transform (IFFT) 306 are used to determine the spectral gains that are to be used for the final filtering in FIR subband 1 through K, which is directly applied to the input subband signals received from buffers 1 through K.

Figure 4:
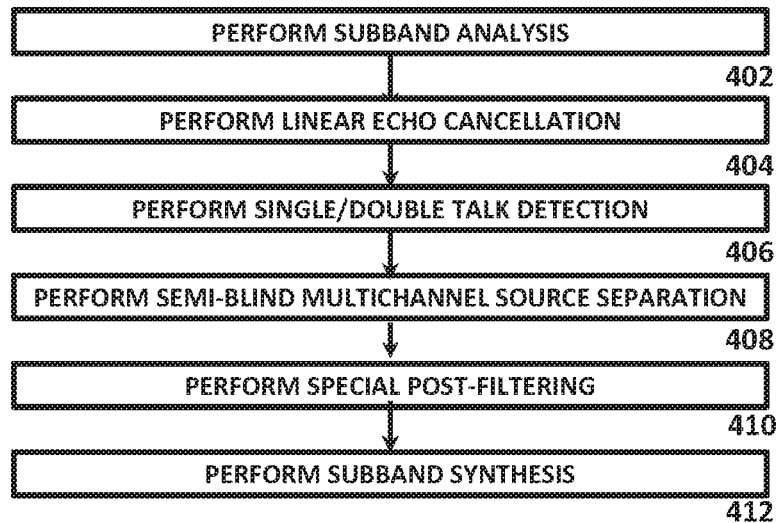
FIG. 4 is a diagram of an algorithm for echo cancellation with loosely paired devices and no echo signal estimate, in accordance with an exemplary embodiment of the present disclosure.

FIG. 4 is a diagram of an algorithm 400 for echo cancellation with loosely paired devices and no echo signal estimate, in accordance with an exemplary embodiment of the present disclosure. Algorithm 400 can be implemented in hardware or a suitable combination of hardware and software, and can be one or more software systems operating on one or more processors.

Algorithm 400 begins at 402, where a subband analysis is performed to transform time-domain signals to K complex-valued, under-sampled subband signals. In one exemplary embodiment, the time-domain signals include time domain audio signals received at two or more microphones, and at least one time domain reference signal generated from at least one audio data source. A separate subband analysis can be performed on each time-domain signal by using a plurality of k complex-valued filter algorithms that are used to receive a sequence of samples of audio data and to generate a sequence of samples of audio data for each of the K subband signals. The algorithm then proceeds to 404.

At 404, linear echo cancellation is performed on the K complex-valued, under-sampled subband signals of the time domain audio signals. In one exemplary embodiment, a linear echo cancellation algorithm such as an adaptive subband multichannel normalized least mean square adaptation can be used that receives each of a sequence of samples of audio data for each of the K subband signals, such as from separate buffers, and which generates linear echo cancelled-audio data that is stored in buffers. In one exemplary embodiment, a suitable algorithm is disclosed in "Systems and methods for echo cancellation and echo suppression", U.S. Pat. No. 8,634,569, which is hereby incorporated by reference for all purposes as if set forth herein in its entirety. The algorithm then proceeds to 406.

At 406, single/double talk detection processing is performed to generate a probability of acoustic echo dominance, as previously discussed. The output of this processing can include a binary probability indicator or other suitable data. The algorithm then proceeds to 408.

At 408, a semi-blind multichannel source separation is performed on the linear echo-cancelled audio data using ICA, by decomposing the input signal into a near-end source signal and a residual echo signal. In one exemplary embodiment, the binary probability indicator can be transformed to "weights" to control a weighted natural gradient adaptation algorithm, as discussed above, or other suitable processes can also or alternatively be used. The algorithm then proceeds to 410.

At 410, a spectral postfilter algorithm is used to remove residual echo components from the near-end source signal. In one exemplary embodiment, a Weiner filtering algorithm, a binary masking algorithm or other suitable processes can be used to remove the residual echo components from the near-end source signal. The algorithm then proceeds to 412.

At 412, a subband synthesis algorithm is used to reconstruct the K subband signals to a multichannel time-domain signal.

Figure 5:
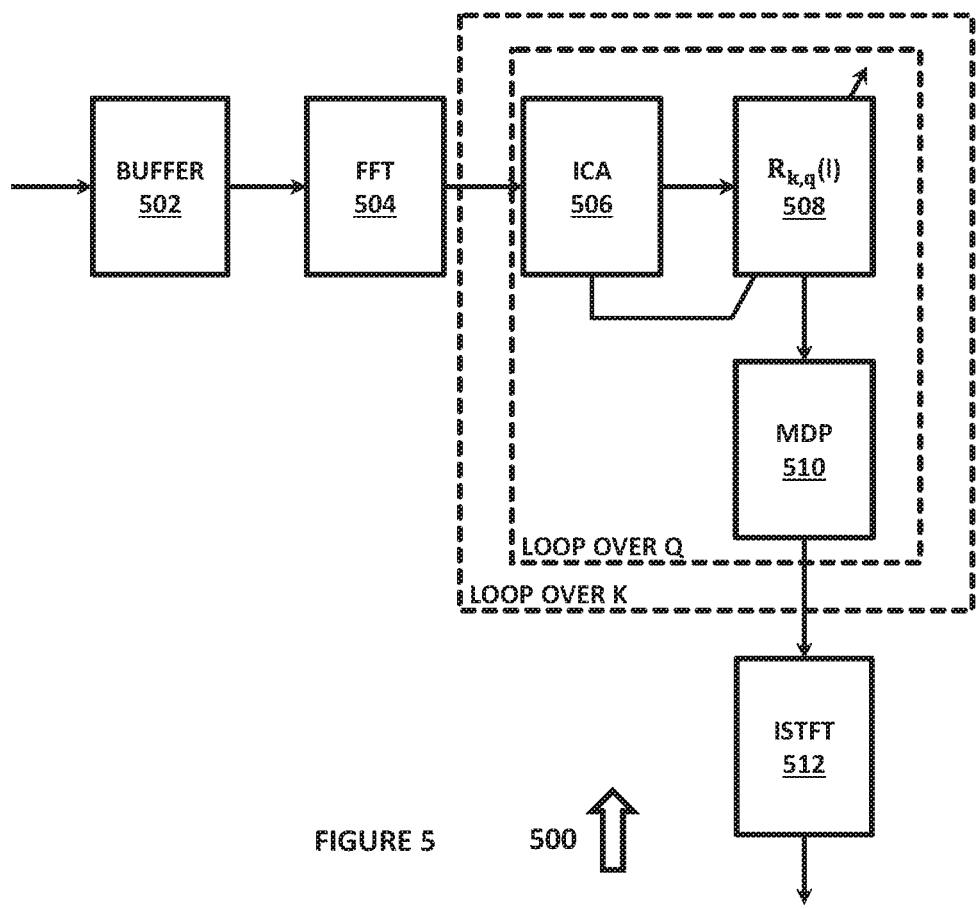
FIG. 5 is a diagram of a system for ICA spatial filter update in accordance with an exemplary embodiment of the present disclosure.

FIG. 5 is a diagram of a system 500 for ICA spatial filter update in accordance with an exemplary embodiment of the present disclosure. System 500 includes buffer 502, FFT 504, ICA 506 with weighted natural gradient, demixing matrix $R_{k,q}(l)$ 508, MDP 510 and inverse short time Fourier transform (ISTFT) 512, each of which can be implemented in hardware or a suitable combination of hardware and software, and which can be one or more software systems operating on a processing platform.

The input to buffer 502 is subband domain signals $B_n^k(l)$ for n=1 to N. The output from buffer 502 to FFT 504 is $B_n^k(l-L_k+1), \ldots, B_n^{k,1}(l)$ 1 to N. The output from FFT 504 to ICA 506 is $M_n^{k,q}(l)$ for n=1 to N. The output from MDP 510 to ISTFT 512 is $R_{k,q}^n(l)$ for n=1 to N. The output of ISTFT 512 is $g_{k,q}^{s,k}(l)$.

For each subband k, the $L_k$ buffered frames are transformed into a higher frequency domain resolution through a fast Fourier transform or other suitable processes, as $$M_i^{l,q}(l) = \text{FFT}[B_i^k(l-L_k+1), \ldots, B_i^k(l)], \forall i$$

where q indicates the frequency bin obtained by the Fourier transformation, $L_k$ is the filter length set for the subband k and $B_i^k$ is the subband buffer. For each subband k and frequency bin q, starting from the current initial N×N demixing matrix $R_{k,q}(l)$, the following relationship is applied:

$$\begin{bmatrix} y_1^{k,q}(l) \\ \ldots \\ y_N^{k,q}(l) \end{bmatrix} = R_{k,q}(l) \begin{bmatrix} M_1^{k,q}(l) \\ \ldots \\ M_N^{k,q}(l) \end{bmatrix}$$

If $z_i^{k,q}(l)$ is the normalized value for $y_i^{k,q}(l)$, which can be calculated as:

$$z_i^{k,q}(l) = y_i^{k,q}(l)/|y_i^{k,q}(l)|$$

and if $y_i^{k,q}(l)'$ can be the conjugate of $y_i^{k,q}(l)$, then a generalized non-linear covariant matrix can be formed as:

$$C_{k,q}(l) = \begin{bmatrix} z_1^{k,q}(l) \\ \ldots \\ z_N^{k,q}(l) \end{bmatrix} [y_1^{k,q}(l)' \ldots y_N^{k,q}(l)']$$

A normalizing scaling factor for the covariant matrix is computed as $s^{k,q}(l)=1/\|C_{k,q}(l)\|\infty$. The operator $\|.\|\infty$ indicates the Chebyshev norm, i.e. the maximum absolute value in the elements of the matrix. Using the weights $\omega i$ as computed above, the weighting matrix can be defined as:

$$W(l) = \begin{bmatrix} \eta w_1 & 0 & 0 & 0 \\ 0 & \eta w_2 & 0 & 0 \\ 0 & 0 & \ldots & 0 \\ 0 & 0 & 0 & \eta w_N \end{bmatrix}$$

where $\eta$ is a step-size parameter that controls the speed of the adaptation. The matrix $Q_{k,q}(l)$ can then be computed as:

$$Q_{k,q}(l) = I - W(l) + s^{k,q}(l) \cdot C_{k,q}(l) W(l)$$

The rotation matrix can then be updated as $$R_{k,q}(l+1) = s^{k,q}(l) \cdot Q_{k,q}(l)^{-1} R_{k,q}(l)$$

where $Q_{k,q(l)}^{-1}$ is the inverse matrix of $Q_{k,q}(l)$. The adaptation of the rotation matrix is applied independently in each subband and frequency but the order of the output is constrained by the weighting matrix which is the same for the given frame. This treatment has the effect of avoiding the internal permutation problem of standard convolutive frequency-domain ICA. Furthermore, it also fixes the external permutation problem, i.e. the target near-end signal will always correspond to the separated output $y_1^{k,q}(l)$, while the remaining outputs will correspond to the residual echo components.

Given the estimated rotation matrix $R_{k,q}(l)$, the MDP from (2) can be used to compute a multichannel image of target source and noise components. First the inverse of $R_{k,q}(l)$ is indicated as $H_{k,q}(l)$. Then, the matrix obtained by setting all of the elements of $H_{k,q}(l)$ to zero except for the $s^{th}$ column is indicated by $H_{k,q}^s(l)$. Finally, the rotation matrix able to extract the multichannel separated image of the $s^{th}$ source signal is obtained as $$R_{k,q}^s(l) = H_{k,q}^s(l) R_{k,q}(l)$$

Note that because of the structure of the matrix W(l), the matrix $R_{k,q}^1(l)$ is the one that will extract the signal components associated to the near-end signal. By indicating with $r_{ij}^{s,k,q}(l)$ the generic (i,j)-th element of $R_{k,q}^s(l)$, the vector $r_{ij}^{s,k}(l) = r_{ij}^{s,k,1}(l), \ldots, r_{ij}^{s,k,Lk}(l)$ can be defined, and the i,j-th filter that is needed for the estimation of the signal s can be computed as:

$$g_{ij}^{s,k}(l) = \text{circshift}\{\text{IFFT}[r_{ij}^{s,k}(l)], \text{delay}^k\},$$

setting to 0 elements $\leq L_k$ AND $\geq$(delay+$L_k$/2+1), where "delay" is the wanted I/O delay defined in the parameters, and where circshift$\{\text{IFFT}[r_{ij}^{s,k}(l)], \text{delay}^k\}$ indicates a circular shift (in the right direction) of delay$^k$ elements defined as if delay>=$L_k$/2 delay$^k$=$L_k$/2 else delay$^k$=delay end

Finally the deconvolution matrix is computed as $$G_k^s(l) = \begin{bmatrix} g_{11}^{s,k}(l) & \ldots & g_{1N}^{s,k}(l) \\ \ldots & \ldots & \ldots \\ g_{N1}^{s,k}(l) & \ldots & g_{NN}^{s,k}(l) \end{bmatrix}$$

There are many advantages to the present disclosure, several of which are provided below, and others of which are readily apparent to one of skill in the art. First, the present disclosure provides a general framework that can be adapted to any suitable scenario, and can accommodate multiple echo sources and multiple microphone inputs. Another advantage is that the present disclosure can be realized by using suitable combinations of linear correlation-based AEC algorithms (such as NLMS, RLS, AP, Sparse NLMS and others), and with semi-blind multichannel separation. The present disclosure can also adopt any suitable formulation for the single/double talk detection to be used to control the semi-blind source separation. It is effectively able to suppress non-linear residual echoes with a limited amount of distortion, such as by using linear multichannel processing employed through the semi-blind demixing system. Nonlinearities in the frequency response of the loudspeakers will not compromise the echo suppression, because linearity can be provided for the frequency response of the microphones. The present disclosure can be used even when there is not exact phase linearity, e.g. when the sampling rates between playback and recordings do not match well or when the playback signal is preprocessed before to be played through the loudspeakers. It can also be utilized when a linear AEC cannot be used. There might be applications where the data throughput is sensible and the full playback reference signals cannot be transferred to the processing system. It allows the cancellation of the echo even in conditions where there is a large delay between the playback and recorded echo signals, and without requiring very long linear filters.

Figure 6:
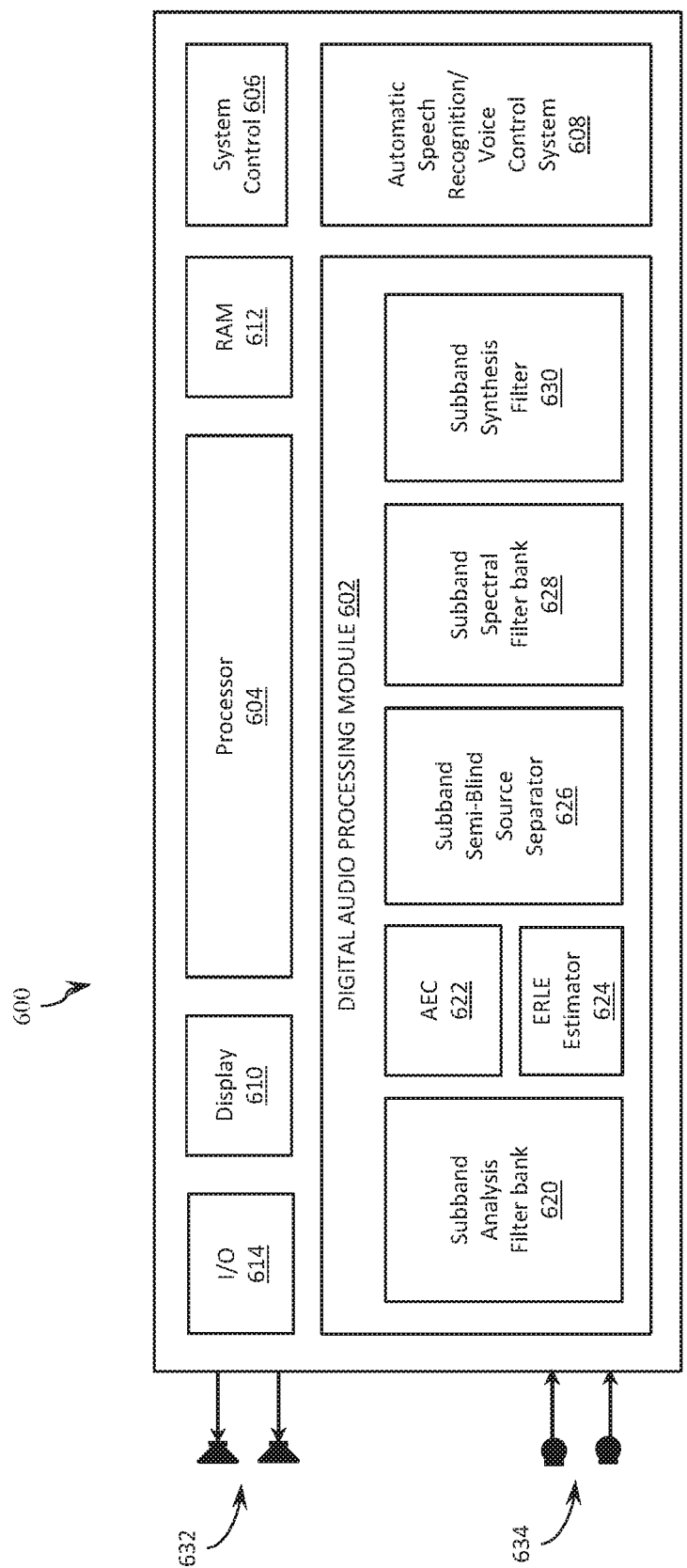
FIG. 6 is a diagram of an exemplary embodiment of a voice controlled device implementing an embodiment of the systems and methods of FIGS. 1-5.

FIG. 6 is a diagram of an exemplary embodiment of a voice controlled device 600 suitable for implementing the systems and methods disclosed herein. The device 600 includes multiple echo sources, such as loudspeakers 632, and multiple audio sensors, such as microphones 634. The device 600 includes a digital audio processing module 602 implementing an embodiment of the audio processing and echo cancellation described herein. The digital audio processing module 602 includes a subband analysis filter bank 620, an optional AEC 622, an ERLE estimator 624 providing a single/double talk probability estimation, subband semi-blind source separator 626, subband spectral filter bank 628 and a subband synthesis filter 630.

In one embodiment, the digital audio processing module 602 is implemented as a dedicated digital signal processor DSP. In an alternative embodiment, the digital audio processing module 602 comprises program memory storing program logic associated with each of the components 620 to 630, for instructing a processor 604 to execute corresponding audio processing and echo cancellation algorithms of the present disclosure.

The device 600 may also include an automatic speech recognition and control system 608 for receiving the processed multichannel audio signal, analyzing the received signal for voice commands and determining an appropriate action in response thereto. Other components of device 600 may include system control logic 606 for instructing the processor 604 to control operation of the device 600, a random access memory 612, a visual display 610 and a user input/output 614.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method comprising:
receiving a multichannel audio signal comprising a plurality of audio channels;
receiving a reference signal;
transforming each of the plurality of audio channels to a plurality of complex-valued subband audio signals, and transforming the reference signal to a corresponding plurality of complex-valued subband reference signals;
producing a probability of acoustic echo dominance for each of the plurality of complex-valued subband audio signals based on the corresponding complex-valued subband reference signal;
performing supervised multichannel linear processing controlled by the corresponding probability of acoustic echo dominance to decompose each complex-valued subband audio signal into a near-end source signal and a residual echo signal;
postfiltering each complex-valued subband audio signal to remove residual echo signal components from the near-end source signal; and
synthesizing the near-end source signals for each of the plurality of audio channels to produce an enhanced multichannel audio signal.

2. The method of claim 1 further comprising performing, for each of the complex-valued subband audio signals, linear echo cancellation of the corresponding complex-valued subband reference signal.

3. The method of claim 2 wherein producing the probability of acoustic echo dominance uses the echo cancelled complex-valued subband audio signals.

4. The method of claim 2 wherein the performing, for each of the complex-valued subband audio signals, the linear echo cancellation of the at least one reference signal further comprises applying an adaptive subband multichannel Normalized Least Mean Square adaptation.

5. The method of claim 1 wherein performing supervised multichannel linear processing further comprises adaptively estimating a near-end demixing filter to automatically track near-end source movements and environmental acoustic changes.

6. The method of claim 5 further comprising using a weighted natural gradient and a single talk probability to induce consistent filter permutation across subbands of the complex-valued subband audio signals for one of the channels.

7. The method of claim 1 wherein performing supervised multichannel linear processing further comprises performing a semi-blind multichannel source separation using independent component analysis ("ICA") controlled by the probability of acoustic echo dominance.

8. The method of claim 7 wherein the performing the semi-blind multichannel source separation comprises determining weights of a diagonal weighting matrix for each microphone channel using the multichannel complex-valued subband audio signals, the multichannel complex-valued subband audio signals after echo cancellation, and the reference signal.

9. The method of claim 1 wherein the producing the probability of acoustic echo dominance comprises computing a subband echo to return loss enhancement ratio (ERLE).

10. The method of claim 1 wherein the removing residual echo signal components from the near-end source signal comprises applying a matrix of time-domain filters, subject to a minimal distortion principle.

11. A system for processing a multichannel audio input signal, comprising:
a subband analysis module operable to transform each channel of the multichannel audio input signal to a plurality of complex-valued subband audio signals;
a single-double talk estimator operable to receive a reference signal and the complex-valued subband audio signals, and produce a probability of acoustic echo dominance for each of the plurality of complex-valued subband audio signals;
a supervised source separation module operable to perform supervised multichannel linear processing controlled by the corresponding probability of acoustic echo dominance to decompose each complex-valued subband audio signal into a near-end source signal and residual echo signal;

a spectral filtering module operable to remove the residual echo signal components from the near-end source signal; and a subband synthesis module operable to synthesize the near-source signals for each of the plurality of audio channels to produce an enhanced multichannel audio signal.

12. The system of claim 11 further comprising an acoustic echo canceller operable to perform linear echo cancellation of the reference signal from each complex-valued subband audio signal.

13. The system of claim 12 wherein the acoustic echo canceller is further operable to apply an adaptive subband multichannel Normalized Least Mean Square adaptation.

14. The system of claim 11 wherein the supervised source separation module is further operable to perform a semi-blind multichannel source separation using independent component analysis ("ICA") controlled by the probability of acoustic echo dominance.

15. The system of claim 14 wherein the supervised source separation module is further operable to adaptively estimate a near-end demixing filter to track near-end source movements and environmental acoustic changes.

16. The system of claim 15 wherein the supervised source separation module is further operable to perform multichannel estimation using the demixing filter constrained through a minimal distortion principle algorithm.

17. The system of claim 14 wherein the supervised source separation module is further operable to use a weighted natural gradient and single talk probability to induce filter permutation across subbands.

18. The system of claim 14 wherein the supervised source separation module is further operable to determine weights of a diagonal weighting matrix using the probability of acoustic echo dominance, wherein the weights are determined for each channel, a multichannel complex-valued decomposition subband audio signal, the multichannel complex-valued subband signals after echo cancellation, and the reference signals.

19. The system of claim 11 wherein the single-double talk estimator is further operable compute a subband echo to return loss enhancement ratio (ERLE).

20. The system of claim 11 wherein the spectral filtering module is further operable to remove residual echo components from the near-end source signal by applying a matrix of time-domain filters, subject to a minimal distortion principle.

* * * * *